United States Patent
Davies et al.

(10) Patent No.: US 6,448,729 B1
(45) Date of Patent: Sep. 10, 2002

(54) METHOD AND SYSTEM FOR DETECTING A RESISTIVE FORCE APPLIED AGAINST AN AUTOMOTIVE POWER WINDOW

(75) Inventors: Timothy Davies, Hermitage, TN (US); Pascal Bonduel, Bouzy la Foret; Francois Breynaert, Caen, both of (FR); Charles Hopson, Lebanon, TN (US); Christos Kyrtsos, Southfield; Joseph Tyckowski, Clawson, both of MI (US)

(73) Assignee: Meritor Light Vehicle Systems, Inc., Troy, MI (US)

( * ) Notice: Subject to any disclaimer, the term of this patent is extended or adjusted under 35 U.S.C. 154(b) by 13 days.

(21) Appl. No.: 09/598,872

(22) Filed: Jun. 21, 2000

(Under 37 CFR 1.47)

(51) Int. Cl.$^7$ .................................................. H02P 7/00
(52) U.S. Cl. ........................... 318/434; 318/432; 49/26; 49/28
(58) Field of Search .............................. 318/280, 65, 54, 318/432, 434; 49/26, 28; 310/316.01, 323.06; 73/862.23, 862.325

(56) References Cited

U.S. PATENT DOCUMENTS

| | | | |
|---|---|---|---|
| 4,641,067 A | * 2/1987 | Lizawa et al. | ............... 318/287 |
| 5,063,316 A | 11/1991 | E-Ming | ........................ 310/83 |
| 5,780,751 A | * 7/1998 | Nomerange et al. | ... 73/862.321 |
| 5,821,669 A | * 10/1998 | Shih | ............................ 310/323 |
| 5,977,732 A | * 11/1999 | Matsumoto | .................. 318/283 |
| 5,982,131 A | 11/1999 | Aino | ........................... 318/646 |

FOREIGN PATENT DOCUMENTS

| | | |
|---|---|---|
| FR | 2623587 A1 | 5/1989 |
| JP | 63243828 | 10/1988 |
| JP | 10028354 | 1/1998 |

OTHER PUBLICATIONS

References Cited in Search Report.

* cited by examiner

Primary Examiner—Robert E. Nappi
Assistant Examiner—Rita Leykin
(74) Attorney, Agent, or Firm—Carlson, Gaskey & Olds

(57) ABSTRACT

A method and system for detecting the presence of an object caught between an automotive window and its respective frame includes an electric drive motor for opening and closing the automotive window. The electric drive motor receives power from a power supply via a primary brush assembly coupled to a power line. A piezoelectric sensor is mounted on the drive motor for sensing a resistive torque applied to the regulator and generating a signal having a value indicative of the resistive torque. The signal is then transmitted to a control circuit for determining whether or not an object is caught between the window and a frame based on the signal. The signal may be transmitted to the control circuit either by the primary brush assembly via the power line or by a secondary brush assembly coupled directly to the control circuit.

20 Claims, 3 Drawing Sheets

METHOD AND SYSTEM FOR DETECTING A RESISTIVE FORCE APPLIED AGAINST AN AUTOMOTIVE POWER WINDOW

BACKGROUND OF THE INVENTION

This invention relates to methods and systems for detecting a resistive force applied against an automotive power window due to an object caught in the path of the automotive window.

Many of the automotive vehicles today have electronically controlled closures such as windows and perhaps sun/moon roofs. For purposes of this application all of these closures will be referred to as windows. These systems provide the operator with ease in opening and closing the windows. However, if the operator is distracted while closing the window, it is possible for an object, such as an arm, hand or finger, to be caught between the window and the window frame of the automotive window.

A power window system consists of a regulator coupled to the window and driven by an electric drive motor. One standard motor comprises an output shaft connected to a worm associated with a gear wheel. The gear wheel is connected to an output member coupled to the regulator. As the motor rotates, the worm rotates, causing the gear wheel to also rotate. Rotation of the gear wheel results in the regulator being driven upward and downward.

One such system is disclosed in copending application entitled, "Method And System For Detecting An Object Caught In The Path Of An Automotive Window Using A Piezoelectric Torque Sensing Device," having Ser. No. 09/391,298 and filed Sep. 9, 1999.

One technique for sensing/detecting the presence of an object caught between a window and its frame when the window is closed utilizes an elastically deformable damper permits angular displacement between the wheel and the output member in response to a resistive torque being applied to the output member. The angular displacement is then sensed using a pair of angular position encoders, wherein one encoder is associated with the gear wheel and the other encoder is associated with the output member. If an object is present, a resistive torque is applied to the output member causing the damper to deform and generating an angular displacement between the output member and the gear wheel. This technique, however, has several challenging technical issues concerning the dampers. As examples, for the system to provide accurate feedback the elastic compliance must be linear throughout the entire range of torque, and the elastic compliance must allow angular displacements large enough to be detected by the encoders. The system is also complicated since the elastic stiffness changes as the damper ages.

Thus, there exists a need for a method and system for sensing a torque associated with a resistive force applied to a power window that overcomes the problems mentioned above.

SUMMARY OF THE INVENTION

It is an object of the present invention to provide a method and system for sensing a resistive force being applied to a motor shaft of a power window regulator due to an object being caught in the path of the power window.

It is another object of the present invention to sense the resistive force applied to the motor shaft using a piezoelectric sensor.

It is yet another object of the present invention to transmit the detection of the resistive force as sensed by the piezoelectric sensor using a secondary brush coupled to the power window motor.

Still further, it is an object of the present invention to transmit the detection of the resistive force as sensed by the piezoelectric sensor using power line carrier technology.

In carrying out the above objects, and other objects, features and advantages of the present invention, a method is provided for detecting the presence of an object between an automotive window and its respective frame. The method includes opening and closing a window via a regulator driven by an electric drive motor controlled by a control circuit and powered via a power line. The electric drive motor includes a shaft and a gear wheel associated therewith for cooperating with a second gear wheel of an output member coupled to the regulator. The method also includes sensing a resistive torque applied to the regulator and generating a signal having a value proportional to the resistive torque, transmitting the signal to the control circuit via the power line, and processing the signal to determine if an object is caught between the window and its respective frame.

An alternative method is provided for detecting an object in the path of an automotive window. This method includes opening and closing a window via a regulator driven by an electric drive motor controlled by a control circuit. The electric drive motor includes a rotor shaft having a gear wheel associated therewith for cooperating with a second gear wheel of an output member coupled to the regulator. The electric drive motor further includes a secondary brush assembly coupled directly to the control circuit. The method also includes sensing a resistive torque applied to the regulator and generating a signal having a value proportional to the resistive torque, transmitting the signal to the control circuit via the secondary brush assembly, and processing the frequency signal to determine if an object is caught between the window and its respective frame.

Still further, in carrying out the above objects, and other objects, features and advantages of the present invention, a system is provided for carrying out the method steps described above. The system includes an automotive window opening and closing via a regulator driven by an electric drive motor, which receives power from a power supply via a primary brush assembly coupled to a power line. The system also includes a piezoelectric sensor mounted on the drive motor for sensing a resistive torque applied to the regulator and generating a signal having a value indicative of the resistive torque. A connection transmits the signal from the sensor to a control circuit that determines whether or not an object is caught between the window and a frame based on the signal.

These and other features of the present invention can be understood from the following specification and drawings.

DETAILED DESCRIPTION OF A PREFERRED EMBODIMENT

Figure 1:
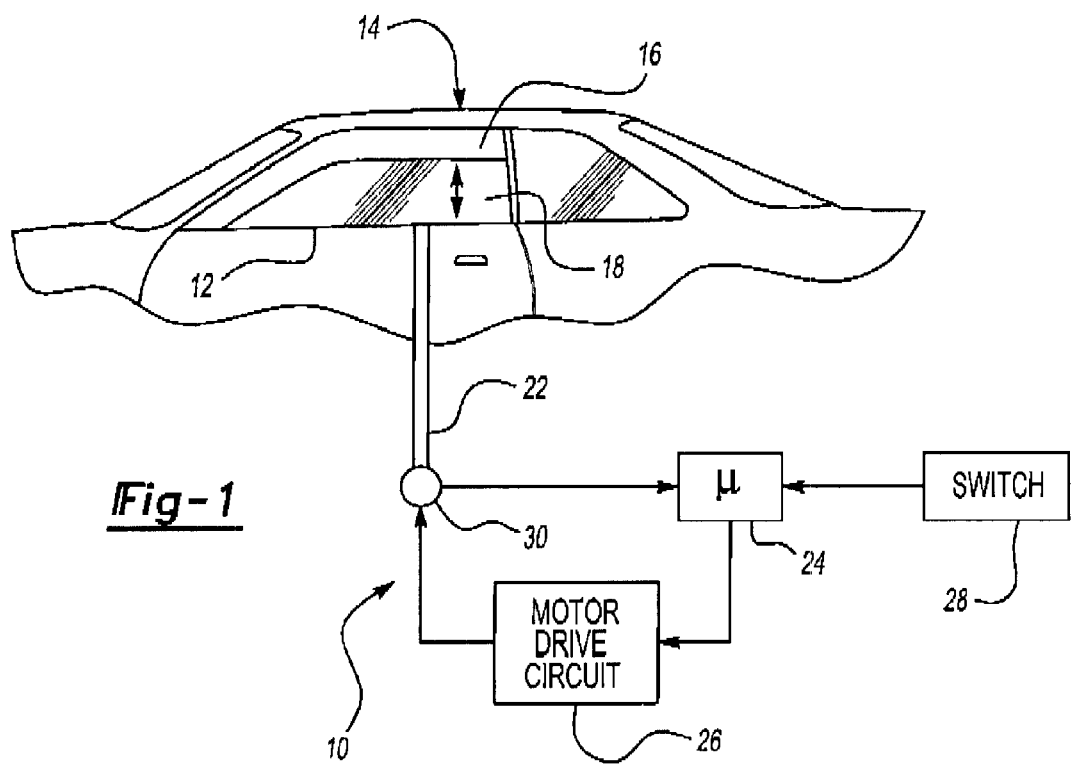
FIG. 1 is a schematic block diagram of a power window system incorporating the torque-sensing device of the present invention.

FIG. 1 shows a power window system 10 incorporating the torque-sensing device of the present invention. An automotive vehicle has a door 12 and a window frame 14 defining a window opening 16. While a side window is shown, the term "window" as used in this application, and in particularly in the claims, also extends to rear windows, moon roofs, sun roofs, or other vehicle closure components.

The door 12 is equipped with a window glass 18 movable elevationally within the window opening 16 and a drive motor 20 linked with a regulator 22 for driving the window glass 18 upward and downward. Microprocessor, or control circuit, 24 controls the drive motor 20 via motor drive circuit 26 in response to signals from switch 28 that commands upward/downward movement of the window glass 18.

Figure 2:
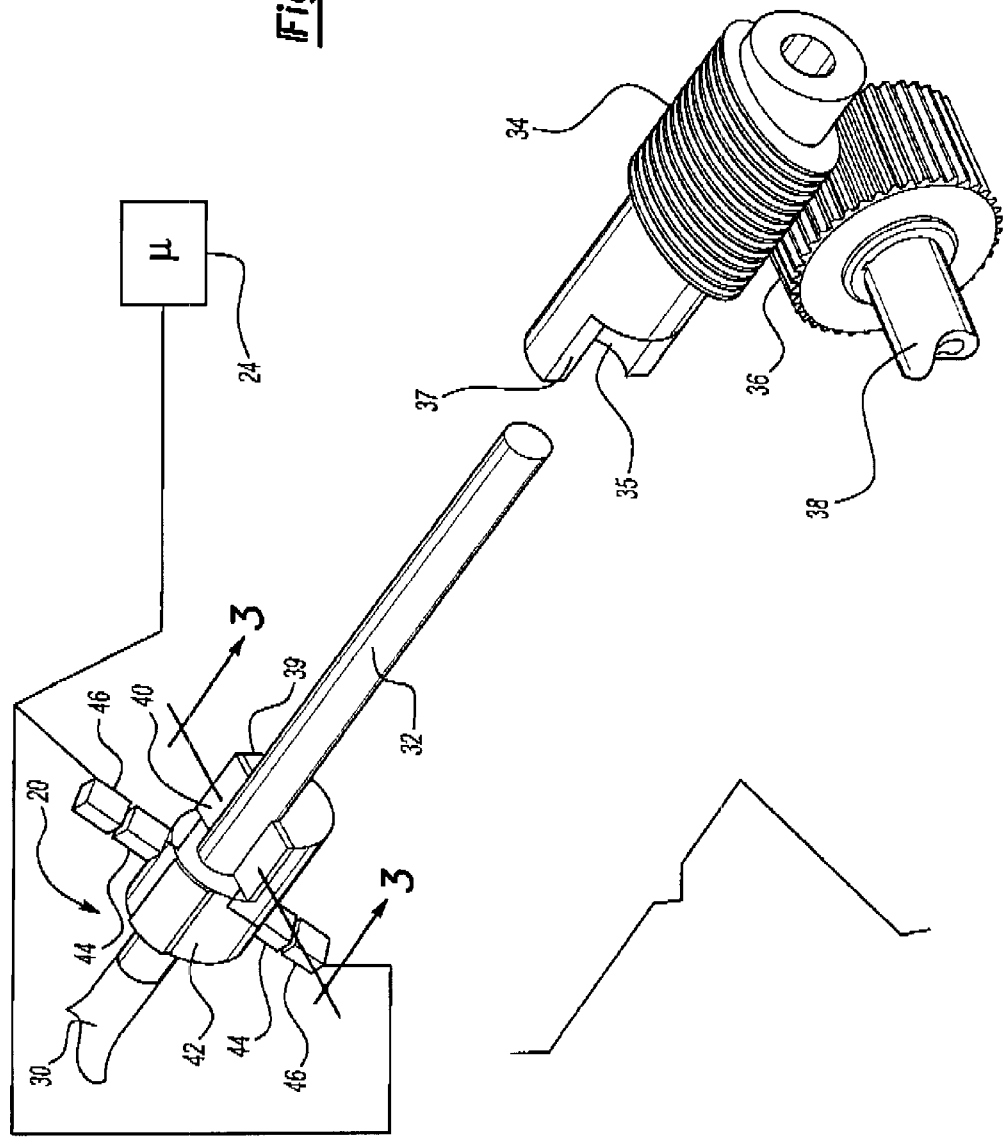
FIG. 2 is a perspective partial view of the torque-sensing device of the present invention.

Turning now to FIG. 2, there is shown a perspective partial view of the torque-sensing device of the present invention. The device is incorporated into the drive motor, denoted generally by 20. Drive motor 20 includes a motor portion 30, an output rotor shaft 32 and a cylindrical worm sleeve 34 that is slidably mounted onto shaft 32. Worm sleeve 34, thus, rotates as rotor shaft 32 rotates causing gear wheel 36 to also rotate. As gear wheel 36 rotates, an output member 38 also rotates. Output member 38 is coupled to regulator 22 so that as output member 38 rotates, regulator 22 moves upward and downward accordingly. The structure of gear wheel 36 and output member 38 is shown somewhat schematically.

Figure 3:
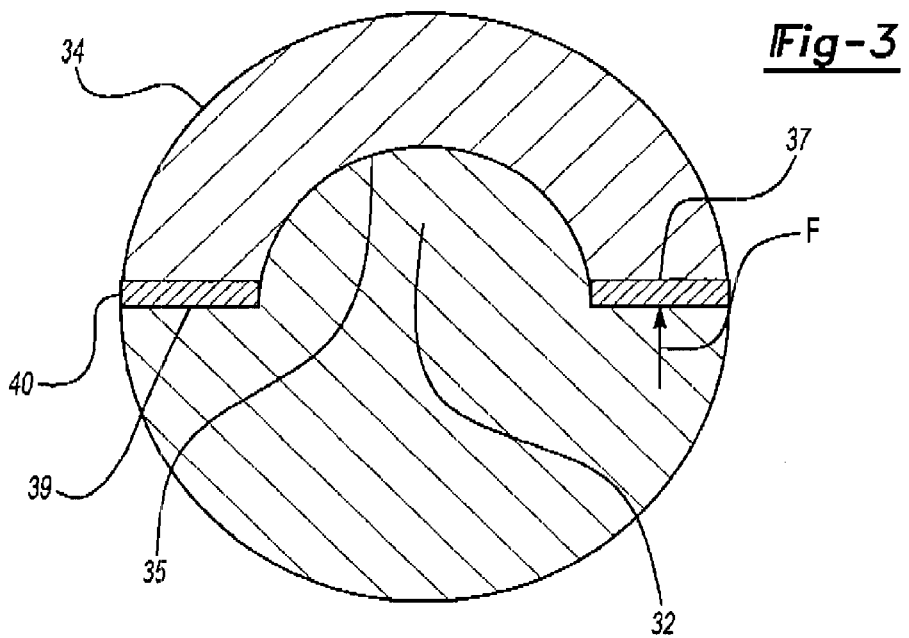
FIG. 3 is a view of another embodiment.

As shown in FIG. 3, a piezoelectric layer 52 is positioned between the components 34 and 32 at an interface surface 37. Thus, a force F will be applied to this piezoelectric layer 5, with the force increasing as the torque between the parts 32 and 34 increases. This torque would provide feedback to the control 24, providing an indication that too much torque is being applied. This can then be taken by the control 24 as an indication of an obstruction being trapped between the glass 18 and the frame 14.

Figure 4:
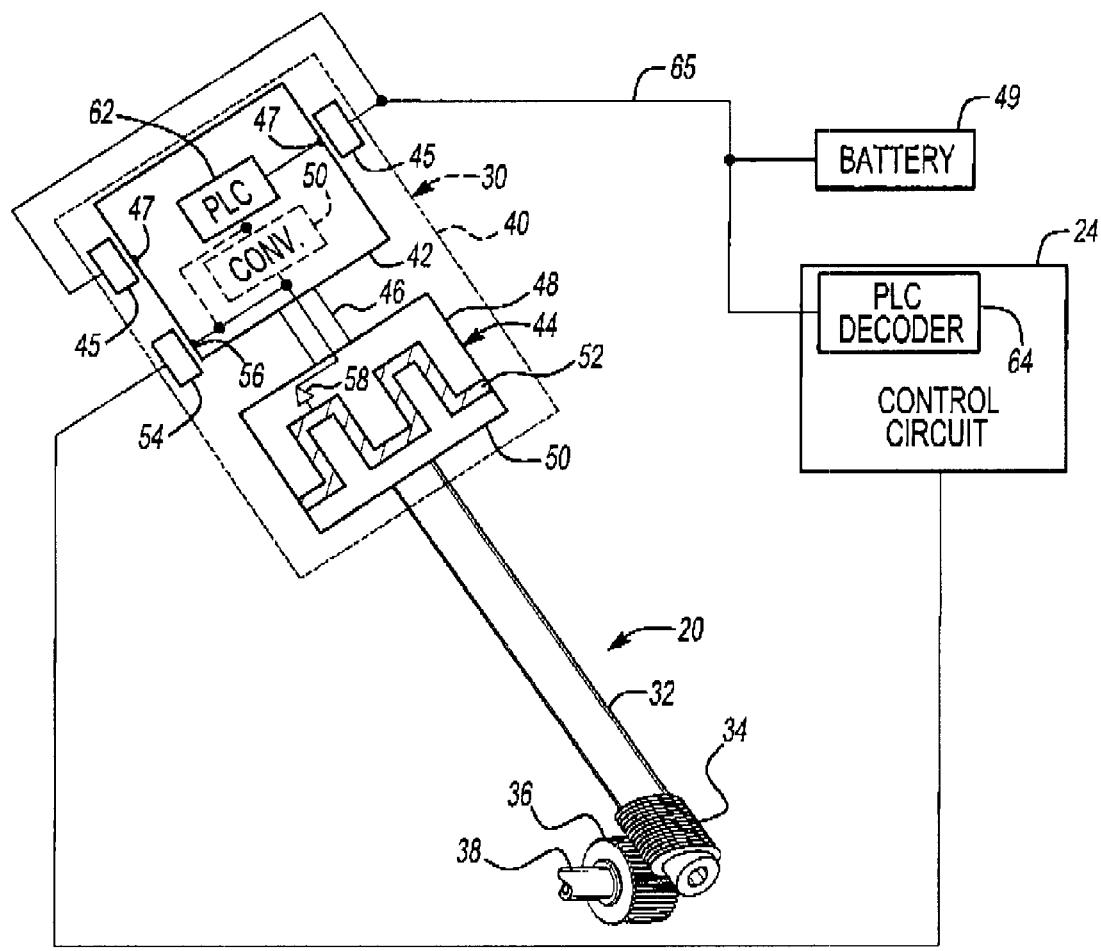
FIG. 4 is a view of another embodiment.

Another embodiment is shown in FIG. 4, with motor portion 30 consisting of a motor housing 40 for housing the rotor 42, which is coupled to a coupler 44 via a coupling shaft 46, primary brushes 45 and primary contacts 47. The brushes 45 are coupled to a power supply 49, such as vehicle battery, and controlled via control circuit 24 to cause rotation of the rotor 42. Coupler 44 includes an upper portion 48 and a lower portion 50 with a piezoelectric sensor layer 52 sandwiched there between. Thus, if there is an obstruction between the window 18 and the frame 14, a resistive force will be applied against the regulator 22 and transferred to the coupler 44. This force is sensed by piezoelectric layer 52, which then generates a signal, such as a voltage signal, having a value proportional to the amount of force being applied against the coupler 44, i.e., if the resistance force increases, then the signal generated by piezoelectric layer 52 increases accordingly.

The signal generated by the piezoelectric layer 52 is then transmitted to the control circuit 24. In operation, the drive motor rotates according to control signals generated by control circuit 24 in response to switch 28. If no resistive force is applied to the output member 38 via the regulator 22, then the worm sleeve 34 is not pressured against piezoelectric layer 52. On the other hand, if a resistive force is applied to the output member 38, the worm sleeve 34 is pressured against the piezoelectric layer 52. Piezoelectric layer 52 generates a signal proportional to this force for receipt by the control circuit 24. This signal is compared to a reference signal. A particular signal level is associated with an indication that an obstruction is in the path of the window. If control circuit 24 senses that this level is passed, then control circuit 24 commands the drive motor 30 to either stop or reverse its direction.

The transmission of the signal generated by the piezoelectric layer 52 to the control circuit 24 may be accomplished in several ways. First, the signal may be transmitted via at least one secondary brush 54 coupled to control circuit 24 and a corresponding secondary contact 56 included in the drive motor 30. Here, the piezoelectric layer 52 is coupled to the secondary contact 56 via a wire connection passing through the coupling shaft 46. Since secondary contact 56 is in rotatable contact with secondary brush 54, the signal is transmitted to the control circuit 24 via the secondary brush 54. A driver/buffer circuit 58 may be coupled between the piezoelectric layer 52 and the secondary contact 56 for amplifying the signal in order to minimize noise and be able to drive other circuits.

As a further enhancement, the driver/buffer circuit 58 may be coupled to a voltage-to-frequency converter 60 prior to being connected to secondary contact 56 for converting the voltage signal produced by the piezoelectric layer 52 into the frequency signal. Thus, noise is minimized even further since a frequency signal is generally not distorted as much as a plain voltage signal.

In an alternative embodiment, the signal from the piezoelectric layer 52 is transmitted to the control circuit 24 via Power Line Carrier (PLC) technology rather than through a rotating electric coupling. In this embodiment, the voltage signal is modulated by a PLC device 62 at a high frequency over the power line via the primary contacts 47 and primary brushes 45. Preferably, the signal is sent using spread spectrum technology so that the bandwidth is large enough to minimize signal degradation. A PLC decoder 64 is required in the control circuit 24 to translate the information from the power line 65.

Here again, the output from the buffer/driver circuit 58 may be passed through the voltage-to-frequency converter 60 before being modulated by the PLC device 62. The signal from the piezoelectric layer 52 is then amplified and converted into a more robust frequency signal before being modulated onto the power line 65.

Consequently, any resistive force applied against the regulator 22 is sensed directly via the piezoelectric layer 52, which in turn generates a signal having a value proportional to the amount of force being applied at the regulator 22. This signal is then transmitted to the control circuit 24, either by way of a rotating electric coupling or by way of power lines to the motor 30, for comparison with a reference signal to determine if the force is sufficient to indicate an obstruction in the path of the power window.

Preferred embodiments have been disclosed. However, a worker in this art would recognize that modifications would come within the scope of this invention. Thus, the following claims should be studied to determine the scope and content of this invention.

What is claimed is:

1. A method for detecting the presence of an object caught between an automotive window and its respective frame comprising:

providing a window opening and closing via a regulator driven by an electric drive motor controlled by a control circuit and powered via a power line, the electric drive motor including a shaft and a gear wheel associated therewith for cooperating with a second gear wheel of an output member coupled to the regulator, and a sensor disposed at a position intermediate said electric drive motor and said regulator;

sensing a resistive torque through said sensor, said resistive torque applied to the regulator and generating a signal having a value proportional to the resistive torque;

transmitting the signal to the control circuit via the power line;

processing the signal to determine if an object is caught between the window and its respective frame; and generating the signal further includes amplifying the signal prior to transmitting the signal.

2. The method as recited in claim 1 wherein generating the signal further includes converting the amplified signal into a frequency signal prior to transmitting the signal.

3. The method as recited in claim 1 wherein processing the signal comprise comparing the signal to a predetermined value; and detecting the object if the signal differs from the predetermined value by a predetermined amount.

4. The method as recited in claim 1 further comprising controlling the drive motor in response to detecting the object.

5. The method as recited in claim 4 wherein controlling the drive motor comprises stopping the drive motor so as to stop the window from closing.

6. The method as recited in claim 4 wherein controlling the drive motor comprises reversing the drive motor so as to open the window.

7. A method for detecting the presence of an object caught between an automotive window and its respective frame comprising:

providing a window opening and closing via a regulator driven by an electric drive motor controlled by a control circuit, the electric drive motor including a rotor shaft having a gear wheel associated therewith for cooperating with a second gear wheel of an output member coupled to the regulator, the electric drive motor further including a primary brush assembly and a secondary brush assembly coupled directly to the control circuit;

sensing a resistive torque applied to the regulator and generating a signal having a value proportional to the resistive torque;

transmitting the signal to the control circuit via the secondary brush assembly; and processing the frequency signal to determine if an object is caught between the window and its respective frame.

8. The method as recited in claim 7 wherein generating the signal further includes amplifying the signal prior to transmitting the signal.

9. The method as recited in claim 8 wherein generating the signal further includes converting the amplified signal into a frequency signal prior to transmitting the signal.

10. The method as recited in claim 7 wherein processing the signal comprises:

comparing the signal to a predetermined value; and detecting the object if the signal differs from the predetermined value by a predetermined amount.

11. The method as recited in claim 7 further comprising controlling the drive motor in response to detecting the object.

12. The method as recited in claim 11 wherein controlling the drive motor comprises stopping the drive motor so as to stop the window from closing.

13. The method as recited in claim 11 wherein controlling the drive motor comprises reversing the drive motor so as to open the window.

14. A window system comprising:

an automotive window opening and closing via a regulator driven by an electric drive motor, the electric drive motor receiving power from a power supply via a primary brush assembly coupled to a power line;

a piezoelectric sensor mounted intermediate said drive motor for sensing a resistive torque applied to the regulator and generating a signal having a value indicative of the resistive torque;

a connection for transmitting the signal from the sensor; and a control circuit in communication with the connection and the drive motor and said regulator, for receiving the signal and determining whether or not an object is caught between the window and a frame based on the signal.

15. The system as recited in claim 14 wherein the connection comprises the primary brush assembly for transmitting the signal to the control circuit via the power line.

16. The system as recited in claim 14 wherein the connection comprises a secondary brush assembly coupled to the control circuit and rotatably coupled to the piezoelectric sensor for transmitting the signal directly to the control circuit.

17. The system as recited in claim 14 wherein the control circuit is further operative to control the drive motor in response to determining the object is present.

18. The system as recited in claim 17 wherein the control circuit, in controlling the drive motor, is further operative to stop the drive motor.

19. The system as recited in claim 17 wherein the control circuit, in controlling the drive motor, is further operative to reverse the drive motor so as to open the window.

20. The system as recited in claim 14 wherein the control circuit, in determining whether or not an object is caught, is further operative to compare the value of the signal with predetermined value.

* * * * *